(12) United States Patent
Yu et al.

(10) Patent No.: US 12,669,652 B2
(45) Date of Patent: Jun. 30, 2026

(54) MULTICAST SWITCH ARRAY AND BEAM STEERING DEVICE USING SAME

(71) Applicants: DAEGU GYEONGBUK INSTITUTE OF SCIENCE AND TECHNOLOGY, Daegu (KR); KOREA ADVANCED INSTITUTE OF SCIENCE AND TECHNOLOGY, Daejeon (KR)

(72) Inventors: Kyoung Sik Yu, Daejeon (KR); Sang Yoon Han, Daegu (KR)

(73) Assignees: DAEGU GYEONGBUK INSTITUTE OF SCIENCE AND TECHNOLOGY, Daegu (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 283 days.

(21) Appl. No.: 18/273,837

(22) PCT Filed: Jan. 26, 2022

(86) PCT No.: PCT/KR2022/001413
§ 371 (c)(1),
(2) Date: Jul. 24, 2023

(87) PCT Pub. No.: WO2022/164206
PCT Pub. Date: Aug. 4, 2022

(65) Prior Publication Data
US 2024/0118497 A1      Apr. 11, 2024

(30) Foreign Application Priority Data

Jan. 26, 2021   (KR) ........................ 10-2021-0011095
Jan. 26, 2022   (KR) ........................ 10-2022-0011864

(51) Int. Cl.
*G02B 6/35* (2006.01)
*G02B 6/34* (2006.01)

(52) U.S. Cl.
CPC ............. *G02B 6/3584* (2013.01); *G02B 6/34* (2013.01)

(58) Field of Classification Search
CPC ............................... G02B 6/3584; G02B 6/34
See application file for complete search history.

(56) References Cited

U.S. PATENT DOCUMENTS

| | | | |
|---|---|---|---|
| 10,466,423 B2 * | 11/2019 | Spector | ............... G02B 6/3598 |
| 11,428,811 B2 * | 8/2022 | Mansur | ............... G02B 6/3534 |
| 11,441,353 B2 * | 9/2022 | Zhang | .................... E06B 9/325 |
| 11,520,438 B2 * | 12/2022 | Drumm | ............... G02B 6/4214 |
| 11,754,683 B2 * | 9/2023 | Seok | ....................... G01S 17/42 356/28 |

(Continued)

FOREIGN PATENT DOCUMENTS

| | | |
|---|---|---|
| CN | 109298404 | 2/2019 |
| JP | 2002-516406 | 6/2002 |

(Continued)

OTHER PUBLICATIONS

EPO, Search Report of EP 22746232.2 dated Nov. 21, 2024, total 10 pages.

*Primary Examiner* — Rhonda S Peace
(74) *Attorney, Agent, or Firm* — LEX IP MEISTER, PLLC

(57) ABSTRACT

A multicast switch array and a multi-beam steering device using the same are provided. Accordingly, it is possible to precisely steer a large-scale multi-beam.

12 Claims, 3 Drawing Sheets

1000

(56) References Cited

U.S. PATENT DOCUMENTS

| | | | |
|---|---|---|---|
| 12,055,631 B2 * | 8/2024 | Moebius | G01S 13/865 |
| 12,140,676 B2 * | 11/2024 | Seok | H10F 77/407 |
| 2012/0170933 A1 | 7/2012 | Doerr | |
| 2014/0339411 A1 * | 11/2014 | Lagace | G01D 5/35316 |
| | | | 250/269.1 |
| 2018/0175961 A1 | 6/2018 | Spector et al. | |
| 2018/0356597 A1 * | 12/2018 | Spector | G02B 6/354 |
| 2019/0146087 A1 * | 5/2019 | Mansur | G02B 6/122 |
| | | | 356/4.01 |
| 2019/0226847 A1 | 7/2019 | Scheirich et al. | |
| 2020/0041728 A1 | 2/2020 | Spector et al. | |
| 2021/0003784 A1 * | 1/2021 | Renshaw | G02B 6/3596 |
| 2021/0116778 A1 * | 4/2021 | Zhang | G02F 1/3137 |
| 2024/0118497 A1 * | 4/2024 | Yu | G02F 1/2955 |

FOREIGN PATENT DOCUMENTS

| | | |
|---|---|---|
| KR | 10-2004-0047326 | 6/2004 |
| KR | 10-2014-0094535 | 7/2014 |
| KR | 10-2019-0093200 | 8/2019 |
| WO | 2020/040854 | 2/2020 |

* cited by examiner

1000

MULTICAST SWITCH ARRAY AND BEAM STEERING DEVICE USING SAME

TECHNICAL FIELD

The present disclosure relates to a beam steering device, and relates to a multi-beam steering device using a multicast switch array.

BACKGROUND ART

The following description is only for the purpose of providing background information related to embodiments of the present disclosure, and the contents to be described do not necessarily constitute prior art.

A beam steering technology is required in fields such as light detection and ranging (LiDAR) and free space optical communication.

The conventional beam steering technology generally uses, for beam steering, an interferometer configured to change, using constructive destructive interference, an optical path through which light can pass.

However, such a beam steering manner has problems in that precise beam steering is difficult, an implementation cost is high, and it is difficult to generate a variable optical path.

A technology capable of variably and precisely steering a beam by means of an optical circuit capable of varying a path through which light can pass is required.

The foregoing background art amounts to technical information that the inventors had been in their possession to derive the present disclosure or acquired in the process of deriving the present disclosure, so shall not be necessarily construed as known technology that has been published to the public before the filing of the present disclosure.

DISCLOSURE OF INVENTION

Technical Problem

An aspect of the present disclosure is to provide a beam steering device for steering a large-scale multi-beam by using a multicast switch array.

An aspect of the present disclosure is to provide a multicast switch array for multi-beam steering.

The aspects of the present disclosure are not limited to the above-mentioned subjects, and other aspects and advantages of the present disclosure, which are not mentioned, may be understood from the following description and will be more clearly understood from embodiments of the present disclosure. In addition, it will be appreciated that the aspects and advantages of the present disclosure can be achieved by the means disclosed in the accompanying claims and combinations thereof.

Solution to Problem

A beam steering device according to an embodiment of the present disclosure may include a switch array including a plurality of switches connected to a first waveguide through which light is input, and a plurality of grating couplers connected to the plurality of switches, wherein the plurality of switches are arranged in a line on a plane of a substrate along the first waveguide, and each of the plurality of switches provides a second waveguide configured to transmit the light to one of the plurality of grating couplers, according to switching on/off of each of the switches.

A switch array for beam steering according to an embodiment of the present disclosure may include a plurality of switches arranged in a line on a plane of a substrate along a first waveguide through which light is input, and connected to the first waveguide, wherein the plurality of switches are connected to a plurality of grating couplers, and each of the plurality of switches provides a second waveguide configured to transmit the light to one of the plurality of grating couplers, according to switching on/off of each of the switches.

Aspects, features, and advantages other than those described above will become apparent from the following drawings, claims, and detailed description of the present disclosure.

Advantageous Effects of Invention

According to an embodiment, a beam steering device capable of steering a large-scale multi-beam by using a multicast switch array is provided.

The advantageous effects of the present disclosure are not limited to those described above, and other effects, which are not mentioned, will be clearly understood by those skilled in the art from the following description.

BEST MODE FOR CARRYING OUT THE INVENTION

Figure 1:
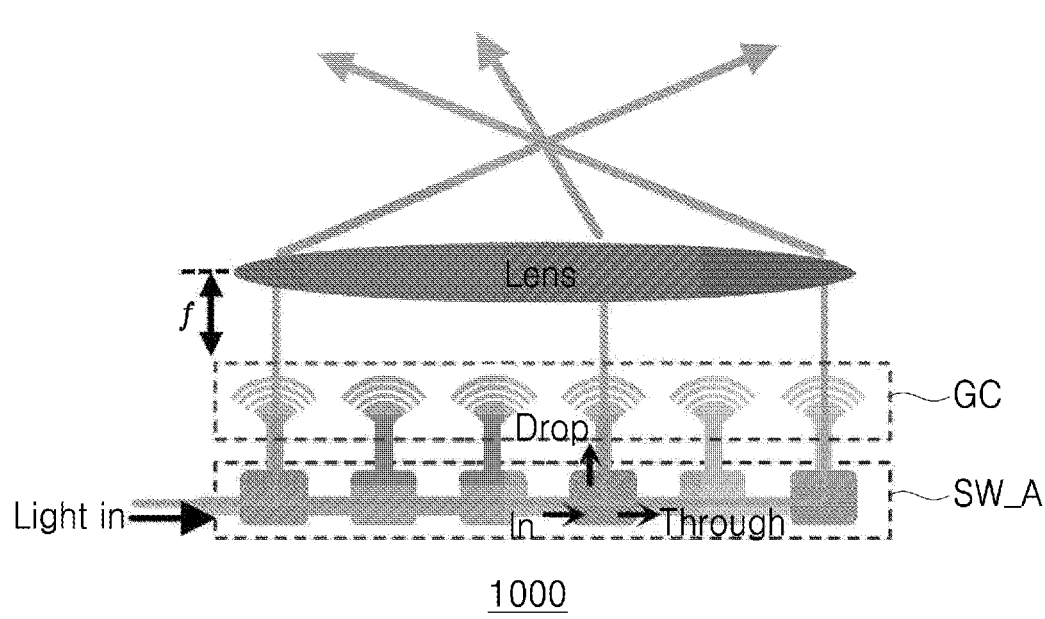
FIG. 1 is a schematic diagram of a beam steering device according to an embodiment.

Hereinafter, the present disclosure will be described in detail with reference to the accompanying drawings. The present disclosure may be implemented in various forms and is not limited to embodiments set forth herein. In the following embodiments, descriptions of features not associated directly with the present disclosure will be omitted in order to clearly explain the present disclosure, but this does not mean that these omitted features are unnecessary in implementing devices or systems to which the idea of the present disclosure is applied. Moreover, throughout the specification, the same or like reference numerals are used to designate the same or like elements.

In the following description, such terms as "first" and "second" may be used to describe various elements, but the elements should not be limited to the terms, and the above terms are used only for the purpose of distinguishing one element from another element. Also, in the following description, the singular forms are intended to include the plural forms as well, unless the context clearly indicates otherwise.

In the following description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Hereinafter, the present disclosure will be described in detail with reference to the accompanying drawings.

FIG. 1 is a schematic diagram of a beam steering device according to an embodiment.

A beam steering device 1000 according to an embodiment steers a beam in a desired direction by connecting an optical switch array (SW_A), a plurality of grating couplers (GC), and a lens. One grating coupler corresponds to one angle at which a beam is emitted.

The optical switch array (SW_A) of the beam steering device 1000 includes a plurality of optical switches (SW). The plurality of optical switches (SW) of the optical switch array (SW_A) may be arranged in a line along a waveguide. Each of the optical switches (SW) is connected to one of the plurality of grating couplers (GC).

When the optical switches (SW) are switched on, input light (In) is routed to a grating coupler (GC) connected to a corresponding optical switch (SW) along a waveguide branching to a drop port (Drop) of the corresponding optical switch (SW), is emitted from the corresponding grating coupler (GC), and forms a beam through the lens. The optical switch (SW) may operate in a manner of moving the waveguide by using a micro-electro-mechanical-system (MEMS).

The light remaining after branching from the optical switch (SW) to the drop port (Drop) is input to a subsequent optical switch along the waveguide through a through port (Through).

The beam steering device 1000 may simultaneously emit beams in multiple directions. That is, the beam steering device 1000 may emit a multi-beam pattern.

For example, the beam steering device 1000 may select at least one switch to be switched on from the switch array (SW_A) according to a desired multi-beam pattern. Each selected switch is switched on, and light is transmitted and emitted along a waveguide of a corresponding switch to one grating coupler (GC) connected to the corresponding switch.

The beam steering device 1000 may project a programmable multi-beam pattern, based on the switch array (SW_A) including the plurality of switches (SW) corresponding to multicast optical switches, respectively.

The multicast optical switches (SW_A) may simultaneously split and transmit light to multiple ports. In addition, the multicast optical switches (SW_A) can finely adjust the intensity of light transmitted to each port differently for each port.

Figure 2:
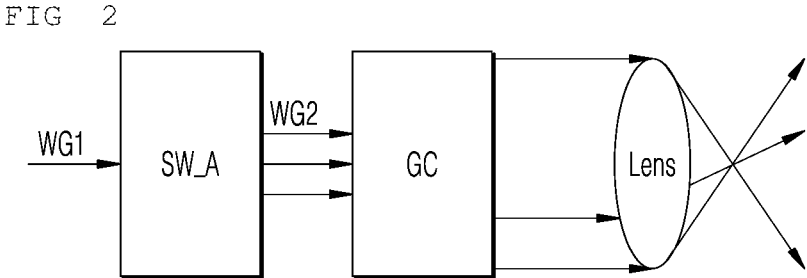
FIG. 2 is a block diagram of a beam steering device according to an embodiment.

FIG. 2 is a block diagram of a beam steering device according to an embodiment.

The beam steering device 1000 according to an embodiment may include a switch array (SW_A) including a plurality of switches (SW) connected to a first waveguide (WG1) through which light is input, and a plurality of grating couplers (GC) connected to the plurality of switches (SW).

The plurality of switches (SW) may be arranged in a line on a plane of a substrate along the first waveguide (WG1), and each of the plurality of switches (SW) may provide a second waveguide (WG2) configured to transmit light to one of the plurality of grating couplers (GC), according to switching on/off of each of the switches.

One second waveguide (WG2) exists for each switched-on switch (SW), and provides an optical path configured to connect the switched-on switch (SW) and a grating coupler. That is, as many second waveguides (WG2) exist as the number of switched-on switches (SW).

The beam steering device 1000 according to an embodiment may further include a lens configured to receive light emitted from the grating couplers (GC).

The switch array (SW_A) may be configured to control switching on/off of each of the plurality of switches (SW) such that the light having passed through the lens forms a predetermined multi-beam pattern.

As described above with reference to FIG. 1, the beam steering device 1000 steers a beam in a desired direction by connecting the optical switch array (SW_A), the plurality of grating couplers (GC), and the lens.

The optical switch array (SW_A) of the beam steering device 1000 includes a plurality of optical switches (SW) to be described later with reference to FIGS. 4 and 5.

When the optical switches (SW) are switched on, light input to a corresponding optical switch (SW) along the first waveguide (WG1) is routed to a grating coupler (GC) connected to the corresponding optical switch (SW) along the second waveguide (WG2), and is emitted toward the lens from the corresponding grating coupler (GC).

The respective grating couplers (GC) of the plurality of grating couplers (GC) may be configured to provide one beam emission angle, and to switch on, among the plurality of switches (SW), a switch (SW) connected to a grating coupler (GC) configured to provide a beam emission angle required for forming a predetermined multi-beam.

The switch array (SW_A) and the plurality of grating couplers (GC) may be disposed on the same substrate plane.

The lens may be spaced apart from the grating couplers (GC) by a focal distance (f), and disposed on a substrate plane, on a plane parallel to the substrate plane, or on a plane perpendicular to the substrate plane. For example, the lens may be disposed to be spaced upward apart by a focal distance (f) of the lens from the plurality of grating couplers (GC).

Figure 3:
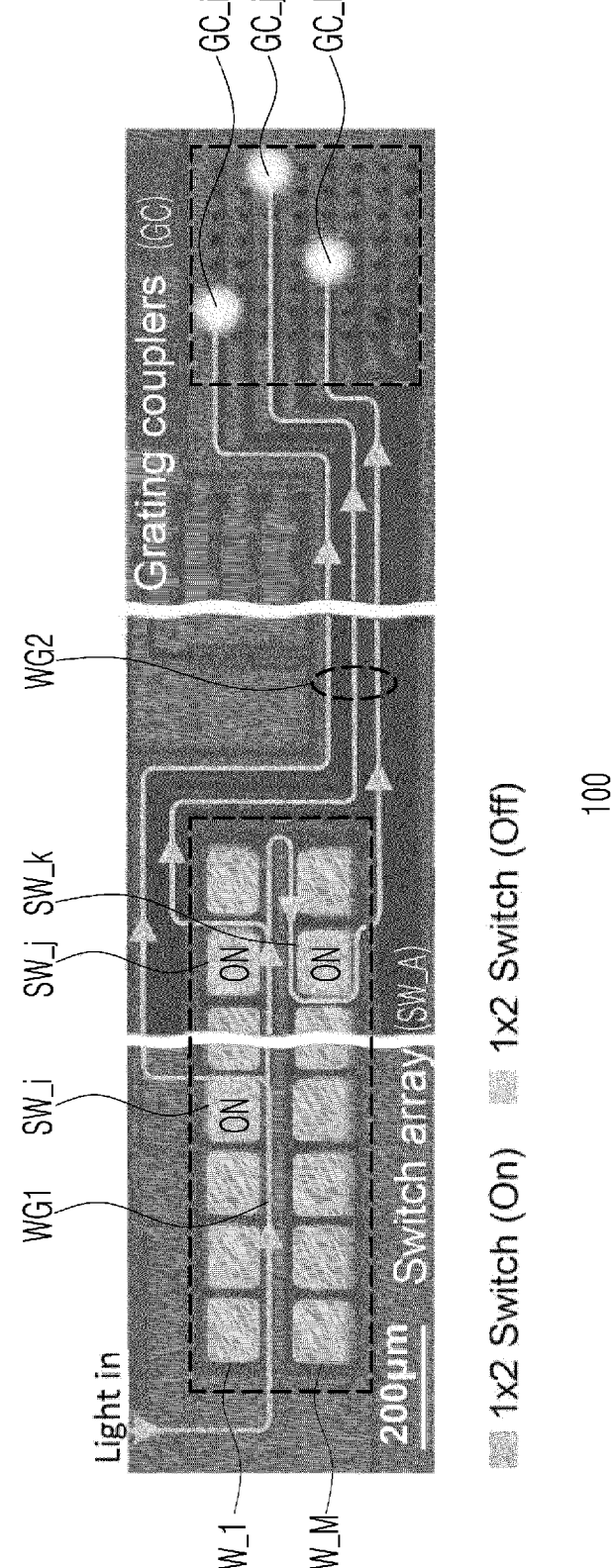
FIG. 3 illustrates an example of a beam steering device according to an embodiment.

FIG. 3 illustrates an example of a beam steering device according to an embodiment.

A beam steering device 100 shown in FIG. 3 is an example of the beam steering device 1000 shown in FIGS. 1 and 2.

In the beam steering device 100 according to an embodiment, a switch array (SW_A) may include a plurality of switches (SW) disposed along a first waveguide (WG1) in one-dimension, for example, in a line. For example, the switch array (SW_A) may have such an array that $N^2$ switches are connected in a $1 \times N^2$ serial manner in the switch array (SW_A) (N is a natural number).

For example, the plurality of switches (SW) of the switch array (SW_A) may be sequentially arranged from switch 1 (SW_1) to switch M (SW_M) along the first waveguide (WG1) from an input port through which input light (Light in) enters. M is $N^2$.

A plurality of grating couplers (GC) are arranged in two-dimensions, for example, in a square shape (N×N) in FIG. 3, but are not limited thereto and may be arranged in various shapes.

Since the arrangement ($1 \times N^2$) of the switch array (SW_A) described above allows light to be distributed from the first waveguide (WG1) to a second waveguide (WG2) by one branching at a switch (SW), when the switch array (SW_A) is arranged in two-dimension (for example, arranged in N×N) to correspond to the plurality of grating couplers (GC), the light loss is reduced compared to the occurrence of two branchings in a row and a column.

The first waveguide (WG1) may be arranged on a substrate in a manner capable of increasing the degree of integration of the plurality of switches (SW). For example, the first waveguide (WG1) may be connected in a zigzag pattern, but is not limited thereto and may be arranged on the substrate in various shapes.

Referring to an example in which three switches (SW_i, SW_j, and SW_k) are switched on in the switch array (SW_A), for example, light input to the three switches (SW_i, SW_j, and SW_k) along the first waveguide (WG1) is transmitted along second waveguides (WG2) from the three switches (SW_i, SW_j, and SW_k) to three grating couplers (GC_i, GC_j, and GC_k), respectively.

Each of the switches (SW) of the switch array (SW_A) is connected to one of the plurality of grating couplers (GC) by a second waveguide. That is, the respective switches (SW) of the switch array (SW_A) and the respective grating couplers (GC) are mapped one-to-one. For example, a series of switches (SW) of the switch array (SW_A) may be sequentially mapped along a column direction or a row direction of the plurality of grating couplers (GC), but is not limited thereto and may be randomly mapped.

The switch array (SW_A) and the plurality of grating couplers (GC) may be arranged on the same substrate plane and connected to each other through the second waveguides (WG2).

Such an arrangement enables the switch array (SW_A) and the plurality of grating couplers (GC) of the beam steering device 1000 to be manufactured as a single layer, and thus is more efficient in terms of the manufacturing cost and process complexity compared to the case where the switch array (SW_A) and the plurality of grating couplers (GC) are stacked and arranged.

In addition, in the case where the switch array (SW_A) and the plurality of grating couplers (GC) are stacked and arranged, there is a limit to making a distance between the plurality of grating couplers (GC) close due to the area on the substrate occupied by the switches (SW).

However, in the beam steering device 1000 according to an embodiment, the plurality of grating couplers (GC) and the switch array (SW_A) are separated and independent from each other without being arranged in a subordinate manner, and thus the distance between the plurality of grating couplers (GC) may be arranged closer without being limited by the area on the substrate occupied by the switches (SW), and accordingly, an emission angle of each of the grating couplers (GC) can be finely adjusted.

Figure 4:
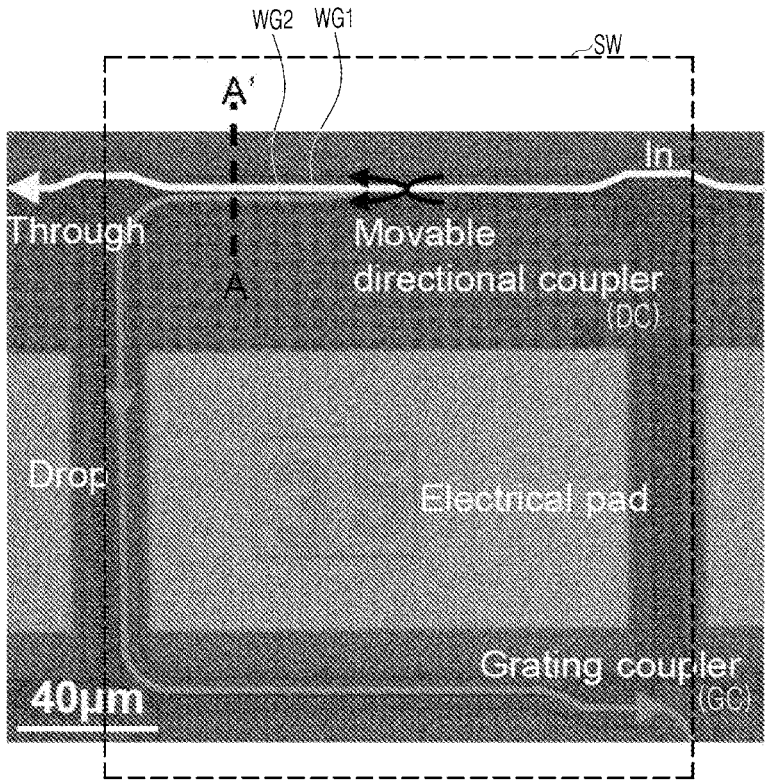
FIG. 4 illustrates an exemplary switch of a beam steering device according to an embodiment.

FIG. 4 illustrates an exemplary switch of a beam steering device according to an embodiment.

Each of the plurality of switches (SW) of the switch array (SW_A) of the beam steering device 1000 according to an embodiment may include a directional coupler (DC) configured to distribute at least a part of input light transmitted along a first waveguide (WG1) to a second waveguide (WG2).

The directional coupler (DC) may include a coupler unit (a coupler with reference to FIG. 5) configured to form at least a part of the second waveguide (WG2). This will be described later with reference to FIG. 5.

In an example, the first waveguide (WG1) and the second waveguide (WG2) are arranged side by side with each other by the directional coupler (DC). The directional coupler (DC) is controlled to absorb a desired amount of light into the second waveguide (WG2) by adjusting a distance between the first waveguide (WG1) and the second waveguide (WG2).

The direction A-A' in FIG. 4 corresponds to the direction A-A' in FIG. 5, and the directional coupler (DC) will be described below with reference to FIG. 5.

Figure 5:
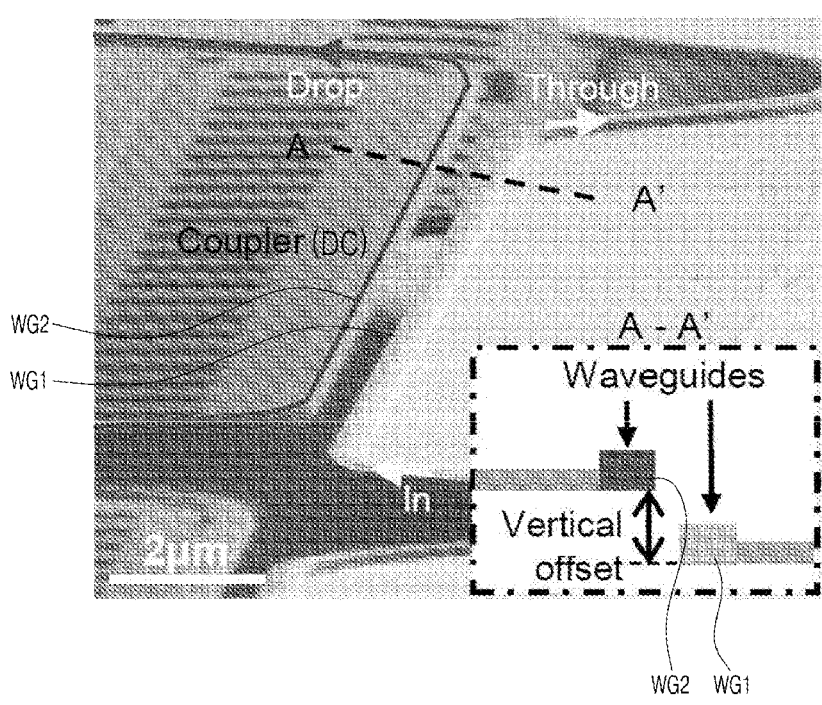
FIG. 5 illustrates an exemplary switch of a beam steering device according to an embodiment.

FIG. 5 illustrates an exemplary switch of a beam steering device according to an embodiment.

Each of the plurality of switches (SW) of the switch array (SW_A) of the beam steering device 1000 according to an embodiment may include a directional coupler (DC) configured to distribute at least a part of input light transmitted along a first waveguide (WG1) to a second waveguide (WG2).

The directional coupler (DC) may include a coupler unit (coupler) configured to form at least a part of the second waveguide (WG2). The at least a part of the second waveguide (WG2) refers to a part of the second waveguide (WG2) parallel to the first waveguide (WG1).

In an example, the directional coupler (DC) is configured to control an optical power splitting ratio of input light, based on a distance (offset) between at least a part of the second waveguide (WG2) and the first waveguide (WG1).

The directional coupler (DC) may be configured to move the coupler unit (coupler) to adjust a distance (offset) between at least a part of the second waveguide (WG2) and the first waveguide (WG1).

For example, to operate the directional coupler (DC), the coupler unit (coupler) may be controlled to move toward the first waveguide (WG1) in a vertical direction or approach the first waveguide (WG1) in a horizontal direction. For example, the coupler unit (coupler) may be controlled such that one side thereof is fixed and the other side thereof is tilted toward the first waveguide (WG1). The coupler unit (coupler) may adjust a distance (offset) between at least a part of the second waveguide (WG2) and the first waveguide (WG1) in various other manners.

The coupler unit (coupler) may be configured to be movable such that a distance (for example, a vertical offset) between at least a part of the second waveguide (WG2) and the first waveguide (WG1) becomes a predetermined distance value while the at least a part of the second waveguide (WG2) and the first waveguide (WG1) remain parallel to each other. For example, at least a part of the second waveguide (WG2) and the first waveguide (WG1) may be evanescently coupled to each other.

The directional coupler may be configured to move the coupler unit (coupler) by a micro electro mechanical systems (MEMS)-based actuator. For example, a voltage may be applied between the MEMS-based actuator and a substrate to move the coupler unit (coupler) such that a distance to the first waveguide (WG1) becomes a predetermined distance value.

The actuator may be, for example, an electrostatic cantilever actuator, but is not limited thereto, and an actuator operating in various manners may be applied. For example, the actuator may correspond to the coupler unit (coupler).

The beam steering device 1000 according to an embodiment may control an actuator configured to move the switch array (SW_A), the plurality of grating couplers (GC), the directional coupler (DC) of each of the switches (SW), and/or the coupler unit (coupler) by a controller (not shown).

The beam steering device 1000 according to an embodiment may transmit binary data along the second waveguide (WG2) by connecting a modulator to the middle of the second waveguide (WG2). For example, the modulator may be connected to each second waveguide (WG2).

The beam steering device 1000 according to an embodiment may simultaneously transmit light to multiple grating couplers (GC) and simultaneously emit beams in multiple directions. Therefore, multiple targets may be simultaneously tracked at the time of application to light detection and ranging (LiDAR) or the like. In addition, a point-cloud generation time can be improved more efficiently.

The beam steering device 1000 according to an embodiment enables data to be transmitted to several subscribers during free space optical communication or the like.

The above description of embodiments of the present disclosure is only for the purpose of illustration, and those skilled in the art will appreciate that they may be easily changed into other particular forms without departing from the technical idea or the essential features of the present disclosure. Therefore, the embodiments set forth above should be understood not from limitative viewpoints but from illustrative viewpoints in all aspects. For example, respective constituent elements described as a single entity may be implemented as distributed entities, and likewise, constituent elements described as distributed entities may be implemented in a combined form.

The scope of the present disclosure should be determined not by the above detailed description but by the appended claims, and all changes and modifications derived from the meaning and scope of the claims and equivalent concepts thereof shall be construed as falling within the scope of the present disclosure.

The invention claimed is:

1. A beam steering device comprising:
a first waveguide through which light is input;
a switch array comprising a plurality of switches which arranged in a line on a plane of a substrate along the first waveguide and respectively connected to the first waveguide;
a plurality of grating couplers which arranged separately from the plurality of switches and respectively connected to the plurality of switches; and
a lens for receiving the light emitted from the plurality of grating couplers,
wherein the plurality of grating couplers are arranged in a two-dimensional array on the plane of the substrate, and the line of the plurality of switches is disposed outside of an area where the two-dimensional array of the plurality of grating couplers is arranged,
wherein each of the individual switches constituting the plurality of switches provides a second waveguide for transmitting the light to a corresponding single grating coupler connected to the individual switch by switching on, such that the light is branched directly from the first waveguide to the corresponding single grating coupler via only one switch,
wherein each of the plurality of grating couplers provides one fixed beam emission angle determined by a position of each grating coupler relative to the lens, and
wherein the switch array is configured to perform a multicast operation by simultaneously switching on two or more switches to distribute the input light from the first waveguide into two or more second waveguides with a controllable power splitting ratio so that the light passing through the lens forms a predetermined multi-beam pattern corresponding to the two or more switched-on switches.

2. The beam steering device of claim 1, wherein each of the plurality of switches comprises a directional coupler configured to distribute at least a part of input light transmitted along the first waveguide to the second waveguide.

3. The beam steering device of claim 2, wherein the directional coupler comprises a coupler unit configured to form at least a part of the second waveguide.

4. The beam steering device of claim 3, wherein the directional coupler is configured to control an optical power splitting ratio of the input light, based on a distance between the at least a part of the second waveguide and the first waveguide.

5. The beam steering device of claim 3, wherein the directional coupler is configured to move the coupler unit to adjust a distance between the at least a part of the second waveguide and the first waveguide.

6. The beam steering device of claim 5, wherein the coupler unit is configured to be movable such that the distance between the at least a part of the second waveguide and the first waveguide becomes a predetermined distance value while the at least a part of the second waveguide and the first waveguide remain parallel to each other.

7. The beam steering device of claim 5, wherein the directional coupler is configured to move the coupler unit by a micro electro mechanical systems (MEMS)-based actuator.

8. A switch array for beam steering, the switch array comprising:
a plurality of switches arranged in a line on a plane of a substrate along a first waveguide through which light is input, and connected to the first waveguide,
wherein the plurality of switches are connected to a plurality of grating couplers, each of the plurality of grating couplers provides one beam emission angle,
wherein each of the plurality of switches is configured to provide a second waveguide that branches directly from the first waveguide to a corresponding grating coupler via only one switching stage, wherein each of the plurality of switches comprises a directional coupler configured to control an optical power splitting ratio of the input light from the first waveguide to the second waveguide, and
the switch array is configured to perform a multicast operation by simultaneously switching on two or more switches to distribute the input light into two or more second waveguides with controllable power splitting ratios required for forming a predetermined multi-beam pattern among the plurality of switches.

9. The switch array of claim 8, wherein each of the plurality of switches comprises a directional coupler configured to distribute at least a part of input light transmitted along the first waveguide to the second waveguide.

10. The switch array of claim 9, wherein the directional coupler is configured to control an optical power splitting ratio of the input light, based on a distance between at least a part of the second waveguide and the first waveguide.

11. The switch array of claim 9, wherein the directional coupler is configured to move a coupler unit to adjust a distance between at least a part of the second waveguide and the first waveguide.

12. The switch array of claim 11, wherein the coupler unit is configured to be movable such that the distance between the at least a part of the second waveguide and the first waveguide becomes a predetermined distance value while the at least a part of the second waveguide and the first waveguide remain parallel to each other.

* * * * *